Nov. 30, 1954 F. A. YATES 2,695,969
STATOR CORE CONSTRUCTION FOR DYNAMOELECTRIC MACHINES
Filed Aug. 31, 1950

Witness: Godfrey Pecina

Inventor
Franklin A. Yates
By Joel E. Stanford
Attorney

United States Patent Office 2,695,969
Patented Nov. 30, 1954

2,695,969

STATOR CORE CONSTRUCTION FOR DYNAMOELECTRIC MACHINES

Franklin A. Yates, Basking Ridge, N. J., assignor to The Singer Manufacturing Company, Elizabeth, N. J., a corporation of New Jersey Application August 31, 1950, Serial No. 182,487

1 Claim. (Cl. 310—259)

This invention relates to stator core structure for dynamoelectric machines and to the method of making the same.

More particularly, it relates to the structure of multiple-slot stator cores of very small diameter wherein little or no material is available for rivet holes.

Heretofore, in making stators of this type, the core laminations were stacked on a mandrel and clamped until the winding was applied, the core impregnated with plastic and baked. After this, the mandrel and clamps were removed and the bore finish-ground. The difficulty with this procedure is that the winding is liable to be damaged during the grinding operation.

In accordance with the present invention, this difficulty is removed by finish-grinding the stator bore before the winding is applied and this is accomplished by securing the laminations in rigid stacked relation by molding about them a frame of thermosetting insulating material, which frame extends through each slot at the inner end thereof and terminates at each end of the stack in an integrally molded ring which extends radially over the end lamination to the central bore.

It is a primary object of this invention to provide an unwound stator core structure in which the stacked laminations are permanently secured together without the use of rivets or the like which require the removal of magnetic material.

A further object is to provide a method of constructing a laminated magnetic stator core having a central bore for the rotor, of a diameter of the order of one-half inch, which method shall permit the use of conventional armature winding-machines for placing the windings thereon.

Other objects and advantages of the invention and of the method of making the same will appear hereinafter in connection with the description of the preferred embodiment of the invention illustrated in the accompanying drawings, in which.

Figure 1:
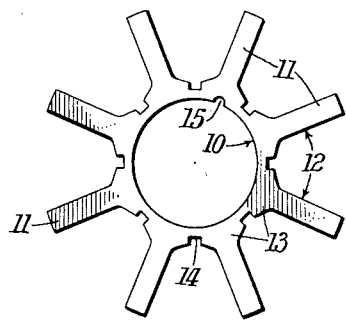
Fig. 1 is a plan view of a stator lamination after blanking from a metal sheet.

The laminations of the stator core are punched by suitable dies from thin sheets of metal having the required magnetic and electrical properties. These laminations each, preferably, have the spider-like shape shown in Fig. 1 and are characterized by having a central bore portion 10 surrounded by radial arm portions 11 spaced circumferentially to define therebetween open slot portions 12 which receive the customary stator windings. Each of said arm portions 11, which constitute the core teeth, is formed at the end thereof adjacent the bore 10 with a tip portion 13 of increased circumferential extent which, as will be seen later, forms the tooth tip for the completed stator core. The tip portions 13 are joined together by a continuous ring of metal just outside the bore 10, which ring has its radial thickness greatly reduced between the tips 13 by slots 14. As a matter of fact, just enough material is left between the bottoms of slots 14 and the bore 10 to give sufficient temporary structural support to the lamination to maintain the circumferential spacing of the arm portions 11 during normal handling, because, as will be seen later, this material is ultimately removed to form an open-slot core assembly. A marker slot 15 is employed, as is customary, to assist in aligning the laminations when they are stacked together to form a core.

Figure 3:
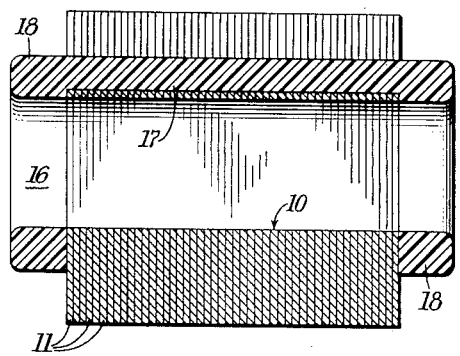
Fig. 3 is a longitudinal section taken on the line 3—3 of Fig. 2.
Figure 2:
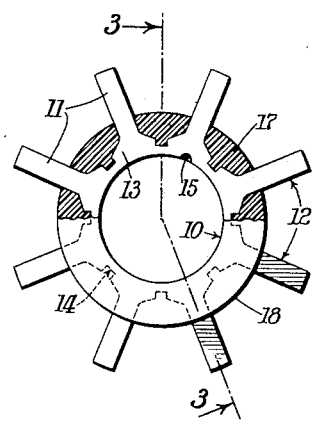
Fig. 2 is an end elevation, partly in section, of a magnetic stator core embodying the invention.

Figs. 2 and 3 illustrate the next stage, according to the invention, in the process of making a stator core. A plurality of the laminations of Fig. 1 are stacked together in face-to-face contact relation to effect the required core length. They are clamped under pressure in this condition while a supporting frame 16 of dielectric insulating material and of generally hollow cylindrical shape is molded about them. As is clearly seen in Fig. 2, portions 17 of this molded frame extend longitudinally through each of the slot portions 12 and terminate at each end of the stack in an integral annular ring portion 18 which extends radially over the end lamination to the central bore 10.

It will be seen that this frame structure 16 effectively anchors said laminations in place against relative movement and provides a rigid core structure which may be handled as roughly as desired, as though said core assembly were secured by the conventional rivets or through-bolts but without the disadvantages thereof.

The core of Figs. 2 and 3 is the full equivalent of the well-known armature rotor core for a commutator machine, and, in fact, an important feature of this open-slot stator core is that conventional automatic armature winding-machines may be employed to apply the windings 19 and 20 externally to this core, thus dispensing with the tedious and expensive hand winding formerly thought necessary for multiple-slot motors of this size.

Preferably, the next step in the process is to grind concentrically both the inner and outer diameters of the stacked core to finished size. In grinding the inner bore 10, it is desirable to provide open slots by grinding away all the material bridging the slots 14 so that the insulating material of the slot portion 17 just breaks through the inner periphery of the finished bore 10ª, as seen in Figs. 4 and 5.

Next, the windings 19 and 20 are applied by a conventional armature-winding machine and, in this connection, it is noted that the slot portions 17 of the frame afford a smooth hard surface against which to lay the turns of the windings, thus minimizing the tendency to puncture the insulation, which tendency exists in the conventional core structures where the slot bottoms present a rough surface due to the exposed edges of the laminations. The windings may therefore be wound tighter, giving a better space factor and improved performance. The molded frame 16 provides a precision form for symmetrically and uniformly spacing the slot windings 19 and 20 from the air gap, thus minimizing the electrical unbalance between the windings and further improving the performance. The end-ring portions 18 of the insulated frame 16 provide generous support for the end-turn portions of the windings 19 and 20. This gives mechanical protection against possible rotor interference and insures a compact, rigid winding structure. The very smooth bore 10ª produced by this method of construction reduces windage losses and slot noise.

Figure 4:
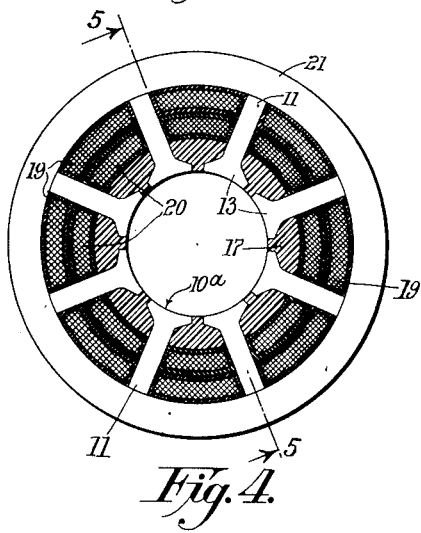
Fig. 4 is a transverse section taken through a completed core, including the windings and yoke.
Figure 5:
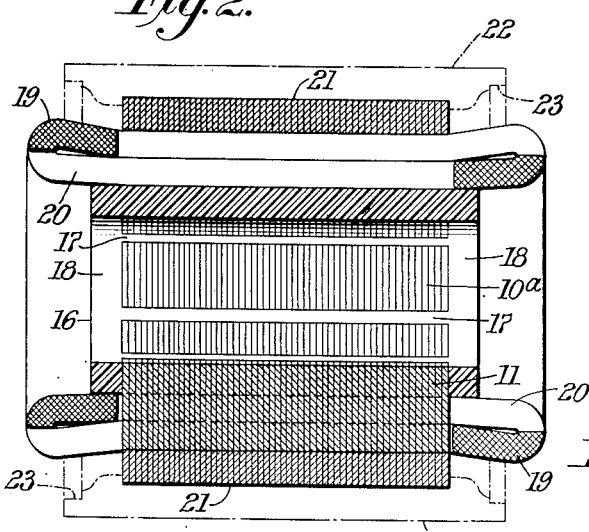
Fig. 5 is a longitudinal section taken on the line 5—5 of Fig. 4 and showing the location of the stator frame.

A yoke 21 made up of stacked laminations of annular ring shape is pushed on over the core of stacked laminations 11 as seen in Fig. 4. The yoke 21 may employ rivets to hold together the laminations or, preferably, it may be inserted within a cast frame 22 as indicated in Fig. 5. Finished internal shoulders 23, formed on the frame 22, receive end-bells which support bearings for journaling the rotor in the usual manner.

Figure 6:
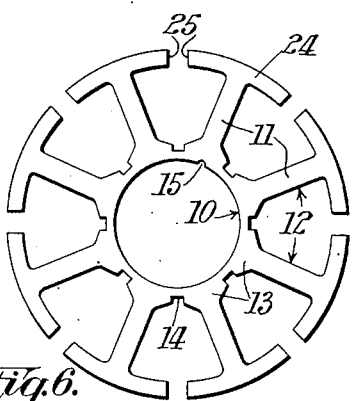
Fig. 6 is a plan view of a lamination modified from that shown in Fig. 1.

In order to minimize the magnetic reluctance of the joints between the outer ends of the teeth 11 and the yoke 21, the modified form of lamination shown in Fig. 6 may be used. In this case, each one of the teeth 11 terminates at its outer end in a circumferentially extended portion 24, so as to enlarge the area of contact with the yoke 21. It will be seen that the slot portion 12 is still open to the exterior through the gap portion 25, and this outwardly open slot constitutes the only limitation to the shape of the core laminations of this invention.

Having thus set forth the nature of the invention, what I claim herein is:

A unitary stator core structure for a dynamo-electric machine, comprising a plurality of magnetic laminations stacked together in aligned face-to-face contact condition to provide a magnetic body having a central rotor-receiving bore and a series of peripherally-spaced imperforate teeth forming a plurality of radial winding-receiving slots surrounding said bore, each slot being separated from said bore by a radially thin wall of magnetic material, and a rigid supporting frame of molded insulating material including elements filling the bottoms of said slots adjacent said thin wall to prevent relative rotative displacement of said laminations, and a continuous annular ring element at each end of the stack for integrally joining said slot-filling elements to prevent relative longitudinal separation of said laminations.

References Cited in the file of this patent

UNITED STATES PATENTS

| Number | Name | Date |
|---|---|---|
| 1,396,521 | Myers | Nov. 8, 1921 |
| 2,153,563 | Hubacker | Apr. 11, 1939 |
| 2,187,033 | Hubacker | Jan. 16, 1940 |
| 2,354,551 | Sawyer | July 25, 1944 |
| 2,423,345 | Roters | July 1, 1947 |
| 2,562,283 | Sawyer | July 31, 1951 |
| 2,607,816 | Ryder et al. | Aug. 19, 1952 |